(12) United States Patent
Ukai et al.

(10) Patent No.: US 6,737,157 B2
(45) Date of Patent: May 18, 2004

(54) COATING TYPE REINFORCEMENT COMPOSITION OF SHEET METAL

(75) Inventors: Masaki Ukai, Takarazuka (JP); Yutaka Sugiura, Daito (JP); Mutsuhisa Miyamoto, Osaka (JP)

(73) Assignee: Sunstar Giken Kabushiki Kaisha, Takatsuki (JP)

( * ) Notice: Subject to any disclaimer, the term of this patent is extended or adjusted under 35 U.S.C. 154(b) by 0 days.

(21) Appl. No.: 10/239,915

(22) PCT Filed: Jan. 31, 2002

(86) PCT No.: PCT/JP02/00757

§ 371 (c)(1),
(2), (4) Date: Sep. 27, 2002

(87) PCT Pub. No.: WO02/061178

PCT Pub. Date: Aug. 8, 2002

(65) Prior Publication Data

US 2003/0055131 A1 Mar. 20, 2003

(30) Foreign Application Priority Data

Feb. 1, 2001 (JP) ........................................ 2001-025498

(51) Int. Cl.[7] .................................................. B32B 15/14
(52) U.S. Cl. .................... 428/301.1; 428/323; 428/324; 428/325; 428/331; 428/418; 523/205; 523/216; 523/217; 523/440; 523/442; 523/444; 523/446; 524/492; 524/493

(58) Field of Search .............................. 428/301.1, 323, 428/324, 325, 331, 418; 204/509, 510; 523/200, 205, 216, 217, 440, 442, 443, 444, 466; 524/492, 493; 106/401, 415, 482, 484, 489

(56) References Cited

FOREIGN PATENT DOCUMENTS

JP 06-172617 6/1994
JP 08-302278 11/1996

*Primary Examiner*—Robert Dawson
*Assistant Examiner*—D. Aylward
(74) *Attorney, Agent, or Firm*—Jacobson Holman PLLC

(57) ABSTRACT

The present invention provides a coating type reinforcement composition of sheet metal which can be applied under warming for ensuring satisfactory levels of tensile rigidity and resistance to dent of a thin sheet metal mainly due to weight reduction of an automobile body, or for collision safety, and which improve a bending strength and a rigidity of the sheet metal without causing a distortion to the sheet metal. The coating type reinforcement composition of sheet metal according to the present invention comprises a liquid epoxy resin, a latent curing agent and an inorganic filler having an aspect ratio (L/D) of 5 or higher, an amount of the inorganic filler contained being 20 to 50% by weight and the composition being a viscous preparation with a high viscosity.

7 Claims, 2 Drawing Sheets

COATING TYPE REINFORCEMENT COMPOSITION OF SHEET METAL

This is a nationalization of PCT/JP02/00757, filed Jan. 31, 2002 and published in Japanese.

TECHNICAL FIELD

The present invention relates to a coating type reinforcement composition of sheet metal, and more particularly a reinforcement composition of a thermosetting epoxy resin which can be applied under warming for ensuring satisfactory levels of tensile rigidity and resistance to dent of a thin sheet metal mainly due to weight reduction of an automobile body, or for collision safety, and which particularly improve a bending strength and a rigidity of the sheet metal without causing a distortion to the sheet metal by blending an inorganic filler of a particular aspect ratio (L/D), as well as a reinforced sheet metal structure using the reinforcement composition, and a reinforcing method of a sheet metal for an automobile body.

BACKGROUND ART

As this kind of a reinforcement of a sheet metal for an automobile body, for example, a thermosetting epoxy resin sheet cut to an appropriate size without or with a restraint layer (e.g., glass cloth or aluminum foil, etc.) laminated on the upper side of the thermosetting epoxy resin sheet and optionally a release paper for prevention of blocking (sticking) provided on the underside of the thermosetting epoxy resin sheet has been greatly used.

Such sheet-type reinforcement (the present type) may be bonded to a predetermined area of the sheet metal and subjected to heat-curing under the baking conditions (typically at 150 to 200° C.) in an electrodeposition furnace in the painting step of automobile manufacturing line to show a reinforcing effect as desired.

However, said application of the reinforcement depended on a human work and the automating thereof was very difficult, which led to the low productivity. In case of omitting the restraint layer, the sheet metal may be distorted due to shrinkage resulting from heat-curing when the thermosetting epoxy resin is designed to have an elastic modulus suitable for obtaining a desired level of reinforcing effect. Further, the cost for disposal of the release paper may not be disregarded.

Under such a circumstances, a great effort has been made to develop a coating type reinforcement composition that can be automatically applied in bead spray or band shape from nozzle for the purpose of increasing the productivity. For example, a composition of a thermosetting epoxy resin blended with a particular placticizer and acrylic powder having a particle diameter of 0.1 to 50 μm is known (referred to Japanese Patent Laid-Open Publication No. 302278/1996). However, this coating type reinforcement composition required heat treatment at 100 to 200° C. for 5 to 180 seconds immediately after application. Further, a placticizer and acrylic powder were blended with an epoxy resin as described above and an elastic modulus is set to a degree of inhibiting an occurrence of distortion in the sheet metal reinforced by the cured composition. Moreover, the composition had a disadvantage that if its elastic modulus is designed to obtain a desirable level of reinforcing effect, it may cause distortion in the sheet metal in the same way as said present type without a restraint layer.

DISCLOSURE OF INVENTION

The present inventors, after intense studies to overcome the above-described problems of such a coating type reinforcement, developed the present invention based on the findings that a viscous composition with a high viscosity comprising a liquid component of thermosetting epoxy resin blended with an inorganic filler of a particular aspect ratio (L/D) can be applied under warming; and by leaving it to cool to a solidification after applying, its scatter, dissolution or omission is not occurred particularly to a shower-resistance and a chemical conversion treatment or electrodeposition solution until the curing/baking step; also in the reinforcing effect, the bending strength and the rigidity of the sheet metal are improved, and the generation of distortion in the sheet metal is prevented after curing.

Accordingly, the present invention provides a coating type reinforcement composition of sheet metal which comprises a liquid epoxy resin, a latent curing agent and an inorganic filler of an aspect ratio (L/D) of 5 or higher, an amount of said inorganic filler contained being 20 to 50% by weight and being a viscous composition with a high viscosity.

In addition, the present invention also provides a reinforced sheet metal which comprises a sheet metal of an automobile body provide with a reinforcement layer obtained by applying said coating type reinforcement composition of sheet metal to the sheet metal and allowing to heat cure; and a reinforcing method of a sheet metal for an automobile body which comprises in automobile manufacturing line, applying said coating type reinforcement composition of sheet metal under warming to a sheet metal which has been press-shaped during the body-making step or those after assembling thereof; passing the coated sheet metal through the pre-treatment and electrodeposition coating steps in the state of leaving it to cool and solidify; and heat-curing under the baking conditions in an electrodeposition furnace during said electrodeposition coating step to form a reinforcement layer.

BEST MODES FOR CARRYING OUT THE INVENTION

Figure 1:
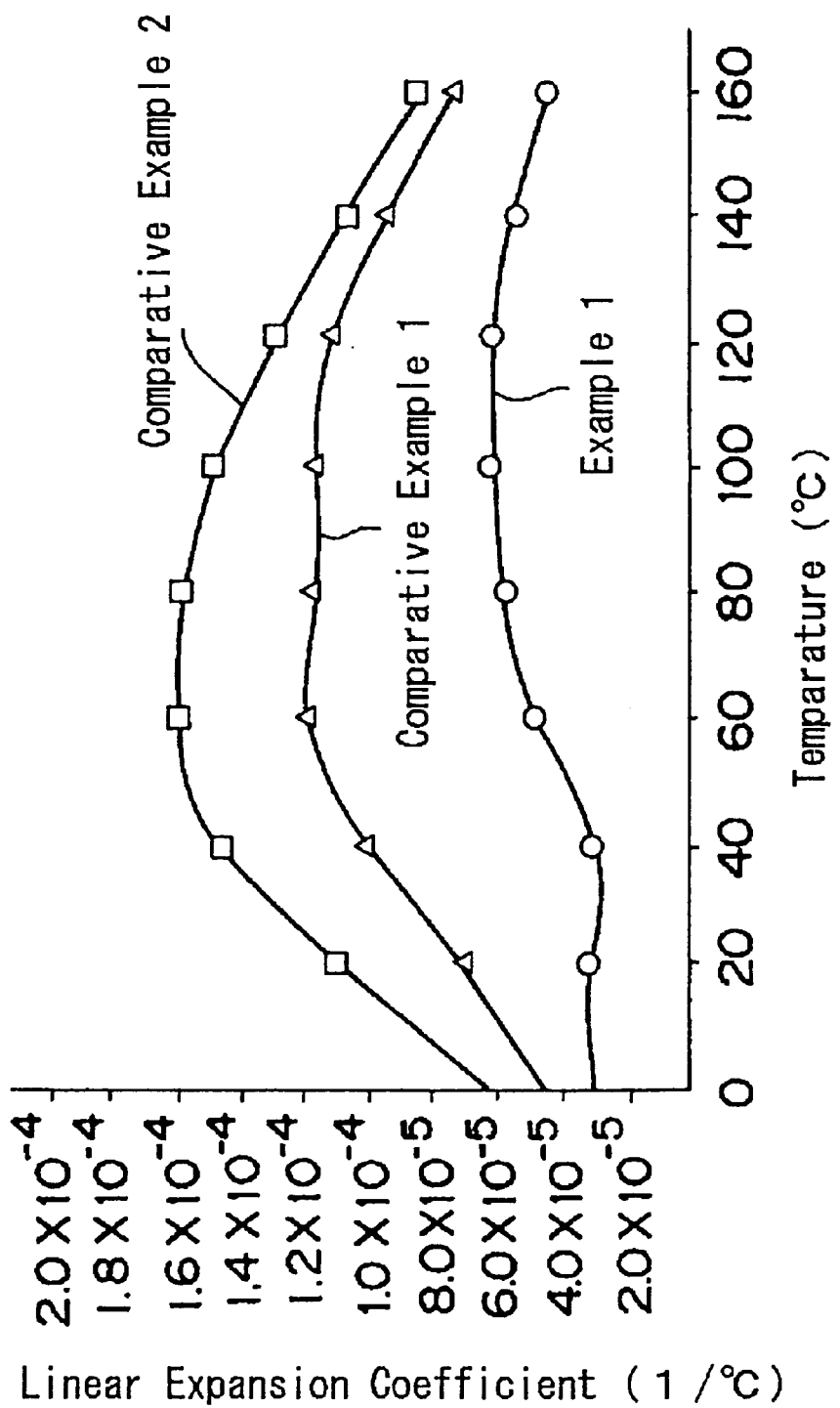
FIG. 1 is a graph showing the measured results of linear expansion coefficient on the test materials of Example 1 and Comparative Examples 1 and 2.

Examples of liquid epoxy resin to be used in a coating type reinforcement composition of sheet metal according to the present invention include those which are conventionally known in the art, including: epoxy resins such as glycidyl ether, glycidyl ester, glycidyl amine, linear aliphatic epoxide or cycloaliphatic epoxide-type resin; and the modified forms thereof, such as, rubber modified epoxy resin [reaction product of bisphenol-type epoxy resin (bisphenol A, bisphenol F, di-glycidyl ether of bisphenol AD, di-glycidyl ether of alkylene oxide adduct of bisphenol A, etc.) and butadiene-acrylonitrile-(metha) acrylic acid copolymer]; urethane modified epoxy resins [reaction product of OH-containing epoxy resin (e.g., di-glycidyl ether of bisphenol A, di-glycidyl ether of aliphatic polyvalent alcohol, etc.) and terminal NCO-containing urethane prepolymer obtained by reaction of polytetramethylene ether glycol (molecular weight=500 to 5000) with an excess amount of diisocyanate (e.g., tolylene diisocyanate or diphenylmethane diisocyanate)]; Thiokol modified epoxy resins, and the like. Epoxy resins may be used alone or in admixture of two or more. The term "liquid" used herein means concept also including those which become liquid-state as being used in admixture with liquid though they are naturally present in a solid form at ordinary temperature.

Any conventional latent curing agents which show curing activity by heat and are typically active at a temperature from 80 to 250° C. may be used as a latent curing agent in the present invention. Particular examples of such curing agent include dicyandiamide, 4,4'-diaminodiphenyl sulfone, imidazole derivatives (e.g., 2-n-heptadecylimidazole), dihydrazide isophthalate, N,N-dialkyl urea derivative, N,N-dialkylthiourea derivative and melamine derivative, and the like. One or admixture of two or more of these curing agents may be used depending on the curing conditions or physical properties used. Curing agent may be used at an amount of 1–30 parts by weight in the liquid epoxy resin of 100 parts by weight.

Examples of inorganic filler to be used in the present invention include calcium carbonate, barium sulfate, magnesium hydroxide, mica, talc, clay, silicic acid or various silicates, carbon black, various metal powders, and the like, which have an aspect ratio (L/D) of 5 or higher, and preferably an aspect ratio of from 10 to 35. Particularly preferable is calcium metasilicate having an aspect ratio of from 10 to 20.

In those inorganic filler with an aspect ratio of less than 5, the difference in the linear expansion coefficient between the maximum value and the value at 20° C. (the 20° C. value) is $5.0 \times 10^{-5}$ (1/° C.) or smaller, with the maximum linear expansion coefficient of higher than $1.0 \times 10^{-4}$ (1/° C.), which may tend to cause a distortion in the sheet metal as shown in Comparative Example 1 described below.

A coating type reinforcement composition of sheet metal according to the present invention comprises any of the above-described liquid epoxy resins, a latent curing agent and an inorganic filler with an aspect ratio of 5 or higher. Particularly, an inorganic filler having an aspect ratio of 5 or higher may be present in the composition at an amount of 20–50% by weight, and preferably 30–40% by weight. A composition containing the inorganic filler at an amount of less than 20% by weight may have a greater difference in the linear expansion coefficient between the maximum value and the 20° C. value and thus be more likely to cause distortion in the sheet metal, while a composition containing the inorganic filler at an amount of more than 50% by weight may not provide sufficient reinforcing effect.

Optionally, the inventive composition may additionally contain an appropriate amount of any inorganic or organic filler having an aspect ratio of less than 5 or any rubber component (e.g., acrylonitrile-isoprene copolymer rubber, acrylonitrile-butadiene copolymer rubber, styrene-butadiene copolymer rubber, butadiene rubber, isoprene rubber, etc.), and/or any conductive material [e.g., a sintered metal oxide-iron oxide complex ferrite represented by formula $MeO.Fe_2O_3$ (wherein Me is a divalent metal such as Mn, Ba, Co, Sr, Pb, Zn, Mg and Cd) or $\alpha\text{-}Fe_2O_3$ powder; metal powder such as silver, copper, palladium, aluminum, nickel or zinc; metal oxide powder such as ruthenium oxide, bismuth oxide or iridium oxide; carbon black powder; graphite powder; and silver coated glass powder].

The above-described coating type reinforcement composition of sheet metal may be viscous and have a high viscosity at ordinary temperature, particularly a viscosity of 700–1200 Pa·s by a Brookfield viscometer (20° C., Rotor No. 7, 10 rpm), and can typically be applied under warming at 35–60° C. (preferably 40–55° C.).

Hereinafter, a reinforcing method of a sheet metal for an automobile body which involves use of a coating type reinforcement composition of sheet metal according to the present invention (inventive composition) will be described in detail.

The inventive composition can be applied to any kind of suitable sheet metal including SPC steel plate, electrogalvanized steel plate, hot dip galvanized steel plate, organic surface treated steel plate, alloyed zinc metallizing steel plate, zinc-nickel alloy metallizing steel plate, tin-lead metallizing steel plate, cationic electrodeposited steel plate, aluminum plate and magnesium plate.

In an automobile manufacturing line [body making step→pre-treatment step (hot water wash and degreasing→water wash→chemical conversion treatment) →electrodeposition coating step (water wash→electrodeposition coating→water wash→baking in an electrodeposition furnace)→various paint operation steps (such as equipment step)], the inventive reinforcing method may be carried out as follows.

First, the inventive composition may be supplied from a supply pump equipped with a heater (which may warm the material to 35 to 60° C.), flow through a temperature controlling piping (35 to 60° C.), and then be applied to a predetermined area of a sheet metal which has been press-shaped (and may have been assembled) during the body making step, wherein the composition may be automatically applied in bead or band shape preferably by a robot. In this case, the composition need not be applied over the whole surface of the predetermined area but rather may be applied from a slit with a given space, which is more economical.

Thickness of the coated composition may typically be 1.5 mm thickness (after curing) which is the standard of the present type, or any suitable thickness such as 1.8 mm, or thinner or thicker. After being applied, the coated composition may be allowed to cool down for hardening.

Next, the coated sheet metal may be passed through said pre-treatment and electrodeposition painting steps (in this case, the coated composition is shower-resistant and will not be scattered in, dissolved in or peeled off by the chemical conversion treatment or electrodeposition solution); and then cured by heating under the baking conditions in the electrodeposition furnace (typically 140–220° C. for 10–60 minutes) in said electrodeposition painting step, thereby forming a reinforcement layer.

In this way, a reinforced sheet metal which comprises a sheet metal of an automobile body provided with a reinforcement layer may be obtained. The reinforcement layer may have a tensile elastic modulus (at 20° C.) of $1.5 \times 10^{10}$ dyne/cm$^2$ or higher, a maximum linear expansion coefficient of $1.0 \times 10^{-4}$ (1/° C.) or lower, and the difference in the linear expansion coefficient between the maximum value and the 20° C. value (i.e., the maximum value minus the 20° C. value) of $5.0 \times 10^{-5}$ (1/° C.) or lower.

The present invention will be described in more detail in reference to the following Example and Comparative Examples.

EXAMPLE 1 AND COMPARATIVE EXAMPLES 1 AND 2

(1) Preparation of a Coating Type Reinforcement Composition of Sheet Metal

Compositions may be prepared using the components listed in Table 1 below (the amounts of the components are also indicated in parts by weight) according to the following procedure.

First, bisphenol A-type epoxy resin and polyether polyol diglycidyl ether are mixed with acrylonitrile-butadiene copolymer rubber (NBR rubber) (33.5% acrylonitrile, Mooney viscosity 78) in a powerful kneader, to which dicyandiamide and dichlorophenyl dimethylurea as latent curing agents, surface treated calcium carbonate, calcium oxide (dehydrating agent) are added. Further, calcium metasilicate having an aspect ratio of 13 (Example 1), calcium metasilicate having an aspect ratio of 3 (Comparative Example 1) or calcium carbonate (Comparative Example 2) is blended and the mixture are subjected to vacuum degassing.

TABLE 1

|  | Example 1 | Comparative Examples | |
|---|---|---|---|
|  |  | 1 | 2 |
| bisphenol A-type epoxy resin | 29 | 29 | 29 |
| polyether polyol di glycidyl ether | 17 | 17 | 17 |
| NBR rubber | 5 | 5 | 5 |
| dicyandiamide | 3 | 3 | 3 |
| dichlorophenyl dimethylurea | 1 | 1 | 1 |
| surface treated calcium carbonate | 8 | 8 | 8 |
| calcium oxide | 1 | 1 | 1 |
| calcium metasilicate (aspect ratio 13) | 36 | — | — |
| (aspect ratio 3) | — | 36 | — |
| calcium carbonate | — | — | 36 |
| Total | 100 | 100 | 100 |

(2) Performance Test

Figure 2:
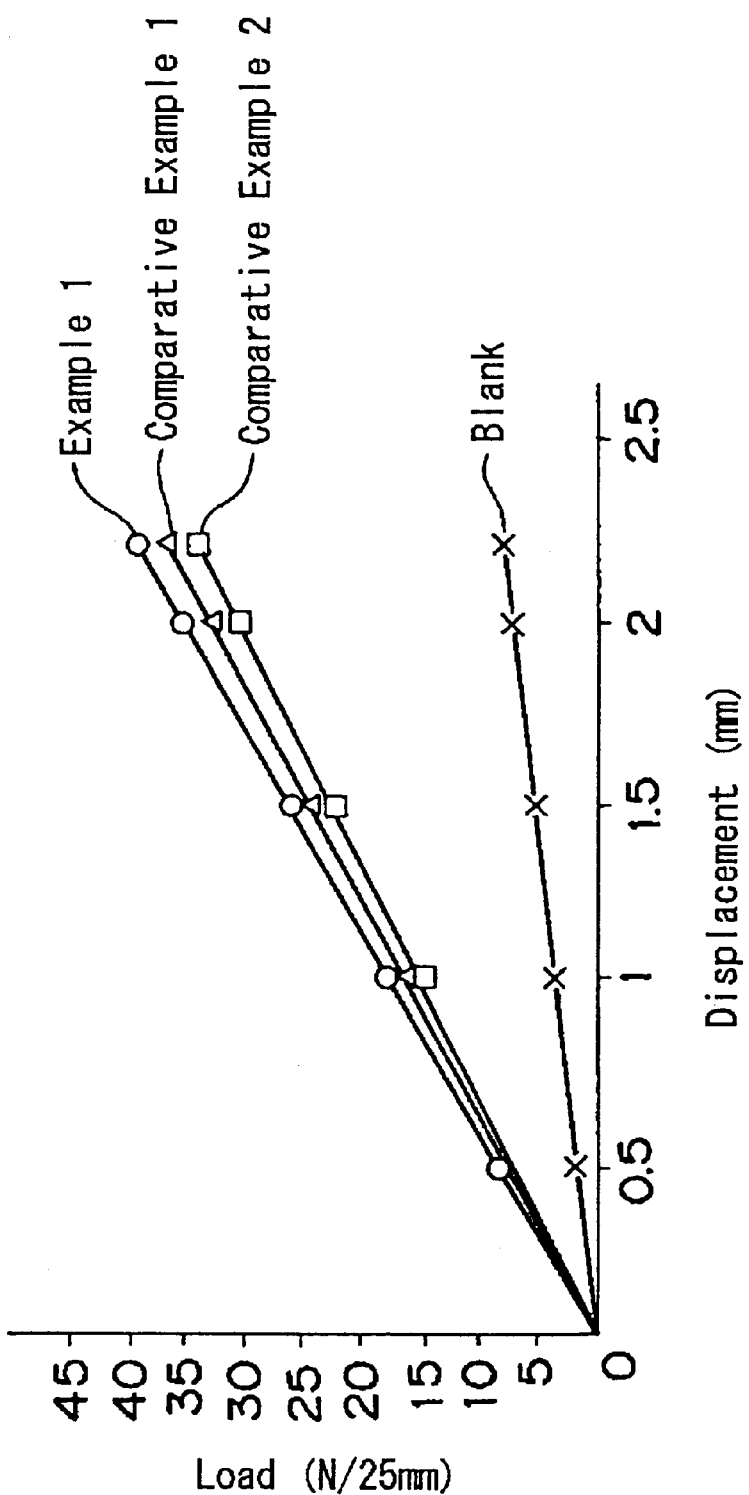
FIG. 2 is a graph showing the results of the bending strength test of the test materials of Example 1 and Comparative Examples 1 and 2 (and blank).

The following tests were performed and results are shown in Table 2 below and FIGS. 1 and 2.

i) Viscosity Measurement

Test materials may be determined for the viscosity (Pa·s) by a Brookfield rotational viscometer (Rotor No. 7, 10 rpm) after controlling the temperature to 20° C.

ii) Linear Expansion Coefficient Measurement

Test materials may be cured in a forced circulating oven at 160° C. for 30 minutes to prepare samples of a predetermined size (cylinder of 5 mm (diameter)×20 mm (height)). Each of these samples may be determined for the linear expansion coefficient (1/° C.) in a TMA analyzer. The maximum value, the 20° C. value and the difference between them for each sample are listed in Table 2. Temperature-dependent change in these values are shown in FIG. 1.

iii) Tensile Elastic Modulus Measurement

Test materials may be cured in a forced circulating oven at 160° C. for 30 minutes, and determined for the tensile elastic modulus (dyne/cm$^2$) at 20° C. in a dynamic viscoelastometer.

iv) Bending Strength

Test materials may be applied to SPC steel plates (25× 200×0.6 mm) (coating thickness=1.5 mm), and cured in a forced circulating oven at 160° C. for 30 minutes to obtain test pieces. Three-point bending test may be performed on these test pieces using a bending-strength test machine according to JIS K 6911 standard under conditions of inter-jig distance between the supports=100 mm and a loading rate=5 mm/minute to determine the load (N/25 mm) at each displacement. Results are shown in FIG. 2 [results for SPC steel plate per se (blank) are also shown]. Particularly, load values for 2 mm displacement are specified in Table 2.

v) Warping Amount (Distorting Evaluation)

Test materials may be applied to SPC steel plate (25× 200×0.6 mm) (coating thickness=1.5 mm), and cured in a forced circulating oven at 160° C. for 30 minutes to obtain test pieces. A weight of 1 kg·f may be placed on one side of each test piece to determine the warping height (mm) on the other side.

TABLE 2

|  | Example 1 | Comparative Examples | |
|---|---|---|---|
|  |  | 1 | 2 |
| i) Viscosity (Pa · s) | 920 | 880 | 770 |
| ii) Linear expansion coefficient (1/° C.) |  |  |  |
| (Maximum value) | $6.3 \times 10^{-5}$ | $1.21 \times 10^{-4}$ | $1.59 \times 10^{-4}$ |
| (20° C. value) | $3.1 \times 10^{-5}$ | $7.27 \times 10^{-5}$ | $1.08 \times 10^{-4}$ |
| (Difference) | $3.2 \times 10^{-5}$ | $4.83 \times 10^{-5}$ | $5.1 \times 10^{-5}$ |
| iii) Tensile elastic modulus (dyne/cm$^2$) | $2.11 \times 10^{10}$ | $2.03 \times 10^{10}$ | $1.95 \times 10^{10}$ |
| iv) Bending Strength (N/25 mm, 2 mm displacement) | 34.8 | 33 | 30.6 |
| v) Warping amount (Distorting evaluation) (mm) | 1 or less | 10 | 35 |

From the data shown in Table 2, it is apparent that the inventive composition (Example 1) has a very high viscosity at 20° C. and no fluidity at ordinary temperature, and is sufficiently resistant against shower, or treatment with chemical-conversion treatment or electrodeposition solution during the pre-treatment and electrodeposition painting steps until the baking step. On the other hand, the difference in the linear expansion coefficient between the maximum value and the 20° C. value (difference in the linear expansion coefficients), which may be a barometer indicative of distorting tendency of a sheet metal caused by the difference in the degree of thermal expansion between the sheet metal and the cured reinforcement composition when they are cooled down from the baking temperature to the cooling temperature as well as by cure shrinkage of the composition applied to the sheet metal. The composition of Example 1 exhibited a very small difference in the linear expansion coefficients and thus may produce less distortion.

Warping amount (mm) was determined to confirm the presence or absence of distortion. This warping amount may be caused by the difference in the linear expansion coefficient between the sheet metal and the cured reinforcement composition. Composition with larger warping amount is more likely to cause distortion in the sheet metal. Therefore, the composition of Example 1, which has a very low warping amount, may cause less distortion in the sheet metal.

The tensile elastic modulus is a factor indicative of reinforcing effect, while the bending strength was obtained by actually performing a strength test. It is apparent that the composition of Example 1, which has a high bending strength, will have superior reinforcing effect.

With regard to the bending strength, Japanese Patent Laid-Open Publication No. 302278/1996 cited herein as a prior art discloses reinforcement compositions which provide bending strengths of from 10.9 to 13.6 in the Examples 1–8 therein, while the composition according to the present invention (Example 1) provides a bending strength that is about two-fold higher than those of the prior art compositions.

As described above, it will be appreciated that the inventive composition can practically reinforce a sheet metal and prevent the generation of distortion therein by reducing the difference in the linear expansion coefficients contrary to each other with retaining high elastic modulus.

INDUSTRIAL APPLICABILITY

The coating type reinforcement composition of sheet metal according to the present invention can be applied to an automobile body under warming to provide enough tensile rigidity/dent resistance of the sheet metal in a light-weighted automobile body, increase collision safety of the body, improve the bending strength and rigidity of the sheet metal and prevent the generation of distortion in the sheet metal. Therefore, the inventive composition is useful for weight-reduction of automobile body.

What is claimed is:

1. A coating type reinforcement composition of sheet metal which comprises a liquid epoxy resin, a latent curing agent and an inorganic filler of an aspect ratio (L/D) of 5 or higher, an amount of said inorganic filler contained being 20 to 50% by weight and being a viscous composition with a high viscosity.

2. The coating type reinforcement composition of sheet metal according to claim 1, wherein the inorganic filler is calcium metasilicate of an aspect ratio of 10 to 20.

3. A reinforced sheet metal which comprises a sheet metal of an automobile body provided with a reinforcement layer obtained by applying a coating type reinforcement composition of sheet metal according to claim 1 to the sheet metal and allowing to heat cure.

4. The reinforced sheet metal according to claim 3, wherein the reinforcement layer has a tensile elastic modulus at 20° C. of $1.5 \times 10^{10}$ dyne/cm$^2$ or higher, a maximum linear expansion coefficient of $1.0 \times 10^{-4}$ (1/° C.) or lower, and the difference in the linear expansion coefficient at 20° C. is $5.0 \times 10^{-5}$ (1/° C.) or lower.

5. A reinforcing method of a sheet metal for an automobile body which comprises in automobile manufacturing line, applying a coating type reinforcement composition of sheet metal according to claim 1 under warming to a sheet metal which has been press-shaped during the body-making step or those after assembling thereof; passing the coated reinforcement composition through the pre-treatment and electrodeposition painting steps in the state of leaving it to cool and solidify; and heat-curing under the baking conditions in an electrodeposition furnace during said electrodeposition painting step to form a reinforcement layer.

6. The reinforcing method according to claim 5, wherein the coating type reinforcement composition of sheet metal is automatically applied under warming at 40 to 55° C. by a robot.

7. The reinforcing method according to claim 6, wherein the coating type reinforcement composition of sheet metal is applied from a slit nozzle.

* * * * *